United States Patent [19]

Bryan et al.

[11] Patent Number: 4,832,905
[45] Date of Patent: May 23, 1989

[54] LOWER END FITTING DEBRIS COLLECTOR

[75] Inventors: William J. Bryan, Granby; Harold V. Lichtenberger, Simsbury, both of Conn.

[73] Assignee: Combustion Engineering, Inc., Windsor, Conn.

[21] Appl. No.: 181,805

[22] Filed: Apr. 15, 1988

[51] Int. Cl.[4] .................. G21C 3/04; G21C 19/04; B01D 25/08

[52] U.S. Cl. .................. 376/352; 376/313; 376/462; 210/488

[58] Field of Search ............ 376/352, 313, 441, 442, 376/462; 210/521, 522, 488, 489

[56] References Cited

U.S. PATENT DOCUMENTS

| | | | |
|---|---|---|---|
| 4,096,032 | 6/1978 | Mayers et al. | 376/313 |
| 4,634,525 | 1/1987 | Yant | 210/488 |
| 4,652,425 | 3/1987 | Ferrari et al. | 376/352 |
| 4,664,880 | 5/1987 | Bryan | 376/352 |
| 4,678,627 | 7/1987 | Rylatt | 376/313 |
| 4,684,495 | 8/1987 | Wilson et al. | 376/352 |
| 4,684,496 | 8/1987 | Wilson et al. | 326/352 |
| 4,781,884 | 11/1988 | Anthony | 376/352 |

*Primary Examiner*—Harvey E. Behrend
*Attorney, Agent, or Firm*—John H. Mulholland

[57] ABSTRACT

A fuel assembly (10) has a lower end fitting debris collector (40) assembled in the form of a welded assembly of an "eggcrate" grid (21) and cast base (40) with hollow legs (42). Fastener seats (46) in hollow legs (42) permit guide tubes (14) with internally threaded ends to be joined to the upper surface of the lower end fitting debris collector (40) by means of slotted fasteners (50). Bevels (62) and notches (64) in the grid bars (26 and 24a, respectively), provide an embodiment with contoured seats for fuel rod end caps (22). Otherwise, end caps (22) rest on grid (21) at the intersection of slottedly interlocked bars (24 and 26). Thin strips (30) mounted in slots between bars (24) and bars (26) provide small debris catching openings in grid (21).

9 Claims, 4 Drawing Sheets

LOWER END FITTING DEBRIS COLLECTOR

FIELD OF THE INVENTION

This invention relates to nuclear fuel assemblies and in particular those assemblies which include spaced fuel rod support grids mounted in a reactor core as a unit. The fuel rods are held between an upper end fitting and a lower end fitting by means of spacer grids. Guide tubes provide the structural integrity between the lower end fitting, the upper end fitting and the spacer grids intermediate the ends of the fuel assembly The spacer grids define an array of fuel rods which, typically, may be rows and columns of 16 rods each. One such spacer and support grid is disclosed in U.S. Pat. No. 3,481,832. The reactor coolant flows upwardly through holes in the lower end fitting, along the fuel rod lower end caps and upwardly along the fuel rod cladding and through the spacer grids in the active region of the fuel assembly.

BACKGROUND OF THE INVENTION

Debris in the coolant which collects or is trapped in fuel rod spacer grids is believed responsible for as many as 30% of known fuel rod failures. Laboratory and in-reactor experience indicate that fuel rod cladding failures can be caused by debris trapped in a grid region which reacts against the fuel rod cladding in a vibratory fashion resulting in rapid wear of the cladding. The size and shape of the debris capable of causing severe damage is quite variable. In fact, metal fragments which can only be picked up with tweezers have been known to "drill" a hole in fuel rod cladding in less than 1,000 hours of reactor operation. Since most failures occur either within or below the first spacer grid, the grids apparently provide a rather good screen for collecting debris. In order to prevent damage in the active area of the reactor, applicants set out to design a device which will trap a large percentage of debris before it gets to the active area.

Previous attempts to treat the debris problem have involved grids in the region of the lower end fitting and the lower rod support grid. One such attempt is the subject of U.S. patent application Ser. No. 020,816 entitled "Debris Catching Strainer Grid", filed Mar. 2, 1987 by Andrew J. Anthony and assigned to the assignee of the instant invention. This grid is typically welded to the upper side of the lower end fitting. Other examples of debris strainers, or traps and grids are seen in U.S. Pat. Nos.: Reissue 27,950; 4,684,495; 4,684,496; 4,652,425; 4,678,627; 4,427,624; 4,096,032; and Japanese Application No. 53-8277, 1-30-1978 (Kokai No. 54-102493, 8-11-1979); German Auslegeschrift No. 1,211,342 (Anmeldetag Feb. 2, 1960); and British Pat. No. 1,214,998. None of these attempts have been totally effective for the purpose intended for reasons of compromise between cost, pressure drop during coolant flow and debris retainability.

Most debris related failures in nuclear reactor fuel are caused by metal shavings, turnings, and pieces of wire that remain in the primary coolant system after maintenance operations. Because of their noncompact shapes, shavings and turnings can be removed from the coolant by passing it through screens having comparatively large holes. More prior art debris interception schemes make use of this technique because it is readily incorporated into existing fuel designs by using a greater number of smaller holes in the lower end fitting.

Debris in the form of wires, having comparatively small cross sections, are more difficult to trap in these devices. Even if these wires strike the debris trap broadside, they have a tendency of bouncing off letting them have another opportunity to penetrate the screen. In order to remove wires from the coolant, flow holes would have to be so small that the pressure drop through them would become unacceptably high, as would their production cost.

SUMMARY OF THE INVENTION

Since the mechanism for failure involves the entrapment of debris in spacer grids, or between fuel rods, an attached grid structure specifically designed to capture debris in a similar manner and located in the lower end fitting of the fuel assembly below the fuel rod cladding provides the filtering required. The filtering device is located below the bottom Inconel grid and fuel rods and is contained in the lower end fitting, which acts as a support member for the grid ligaments.

The invention consists of an egg crate type grid of thick strips or bars which typically houses four or five thin strips between upper pairs of thick strips or as in the upper portion of the grid and four or five thin strips between lower pairs of thick strips or bars normal to the upper thick strips or bars in the lower portion of the grid to filter out debris. The bars or thick strips of the egg crate support the fuel rods and guide tubes while holding the thin filter strips in place. The invention is shown in the form of a 16×16 lower end fitting.

The egg crate, typically, consisting of 0.0625 inch or 0.0937 inch bars, thick strips or ligaments is assembled first. It is made of either a low carbon containing stainless steel or Inconel. Thin strips are then inserted and assembled into the egg crate in slots in the bars, and a continuous weld is run along the top of the egg crate structure securing all of the strips for further processing. This may include further machining or brazing. The grid structure is then secured to a guide tube receiving lower end fitting post casting by welding. One embodiment of the invention has contours at the egg crate ligament or bar intersections, each of which follow the outline of a fuel rod end plug and therefore increase fuel rod support and integrity.

By changing the fluid flow conditions around and through the screening device noted above, it is possible to eliminate some of the prior art shortcomings and to reduce production costs. This is accomplished by locating the thinner screening ligaments in two different planes. This causes the debris to be more easily trapped. Debris, entrained in the fluid, tends to rub against the thin ligaments of the lower plane, causing them to turn in such a fashion as to be trapped by the upper plane of thin ligaments normal to those of the lower plane.

The further modifications to the novel lower end fitting bar intersections mentioned above allow the lower end caps of the fuel rods to rest within mated cutouts in the thicker lower end fitting ligaments or bars, thereby providing additional fuel rod shoulder gap and lateral support.

PREFERRED EMBODIMENTS OF THE INVENTION

Figure 1:
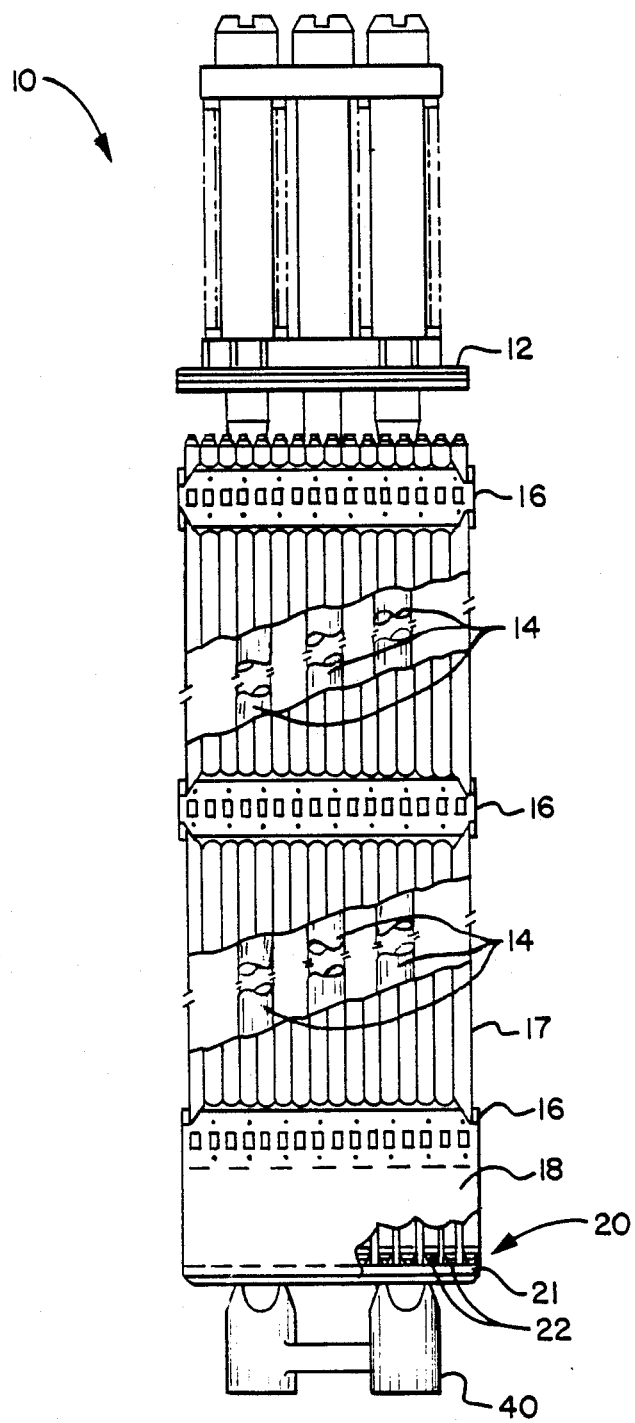
FIG. 1 is a side elevational view of a fuel assembly configuration including the lower end fitting debris collector of the invention.
Figure 2:
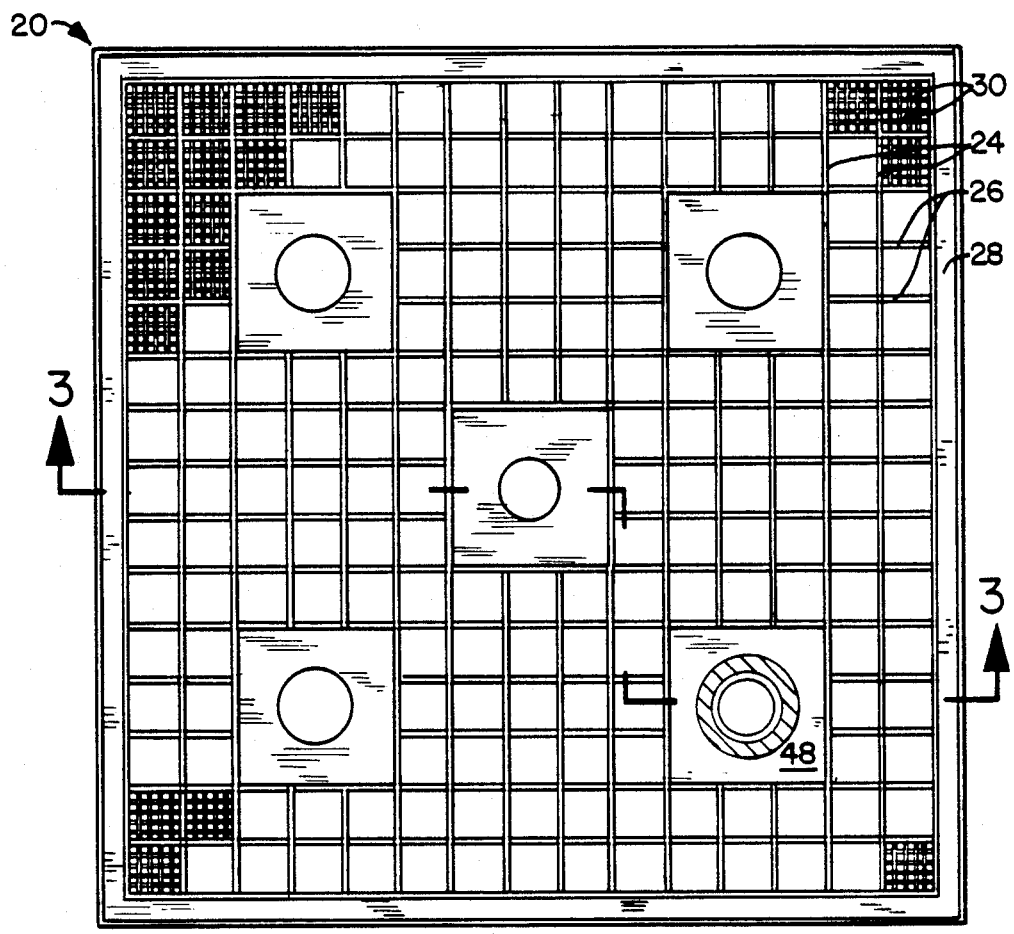
FIG. 2 is a top plan view of the lower end fitting debris collector of FIG. 1 with a representative guide tube end partially shown.

The numeral 10 generally designates a fuel assembly unit. The fuel assembly 10 includes an upper end fitting 12, guide tubes 14, spacer grids 16 supporting fuel rods 17, and a skirt portion 18 shown partially broken away in FIG. 1 to illustrate a lower end fitting debris collector constructed primarily of Inconel according to the principles of the invention, generally designated by the numeral 20. Behind the skirt 18 are debris trapping compartments defined by the lower end fitting debris collector grid 21 and solid fuel rod end caps 22. Each fuel rod end cap 22 is located at the intersection of first intersecting and slottedly interlocked grid forming bars 24, known as top bars because of their lower slots 27. Second grid forming bars 26, which are known as bottom bars because of their upper slots 27 for slottedly interlocking with the grid forming bars 24 along their upper margin. When assembled, the bars 24 in the area of intersection are above the bars 26. The pairs of first and second intersecting and slottedly interlocked grid forming bars 24 and 26 are attached to the perimeter strip 28. Members 24, 26 and 28 may be of Inconcel 718.

The upper bars or thick strips 24 are parallel to each other and the lower bars or thick strips 26 are parallel to each other and normal to the upper bars 24. All of the bars 24 and 26 are welded or brazed to the rectangular perimeter strip 28.

The grid 21 is completed by thin Inconel or other suitable metal strips 30 which are parallel to and mounted between the bars 24 and 26, typically, in groups of two to four parallel strips 30. The strips 30 mounted in slots 32 of bars 24 are normal to the strips 30 mounted in slots 32 of bars 26. As shown, the strips 30 mounted in slots 32 of bars 24 are in engagement with the strips 30 mounted in slots 32 of bars 26, but this is not necessary. All of the strips 30 are welded or brazed to the perimeter strip 28.

Figure 3:
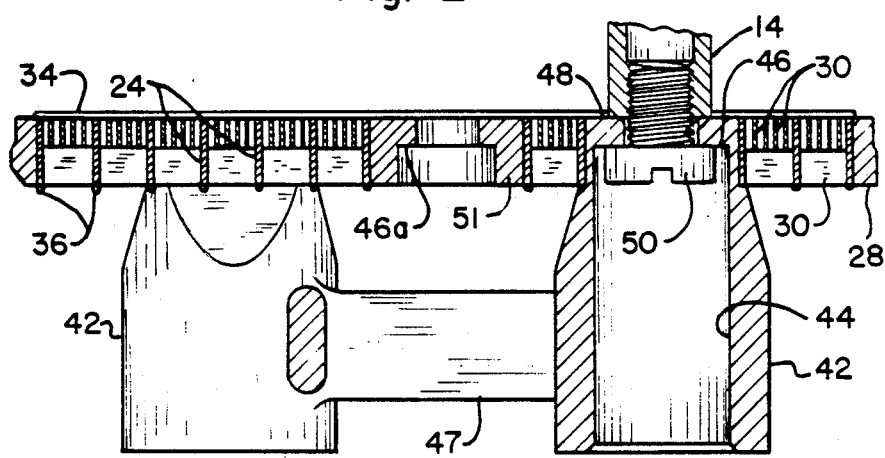
FIG. 3 is a cross-sectional view taken along the line 3—3 of FIG. 2.
Figure 4:
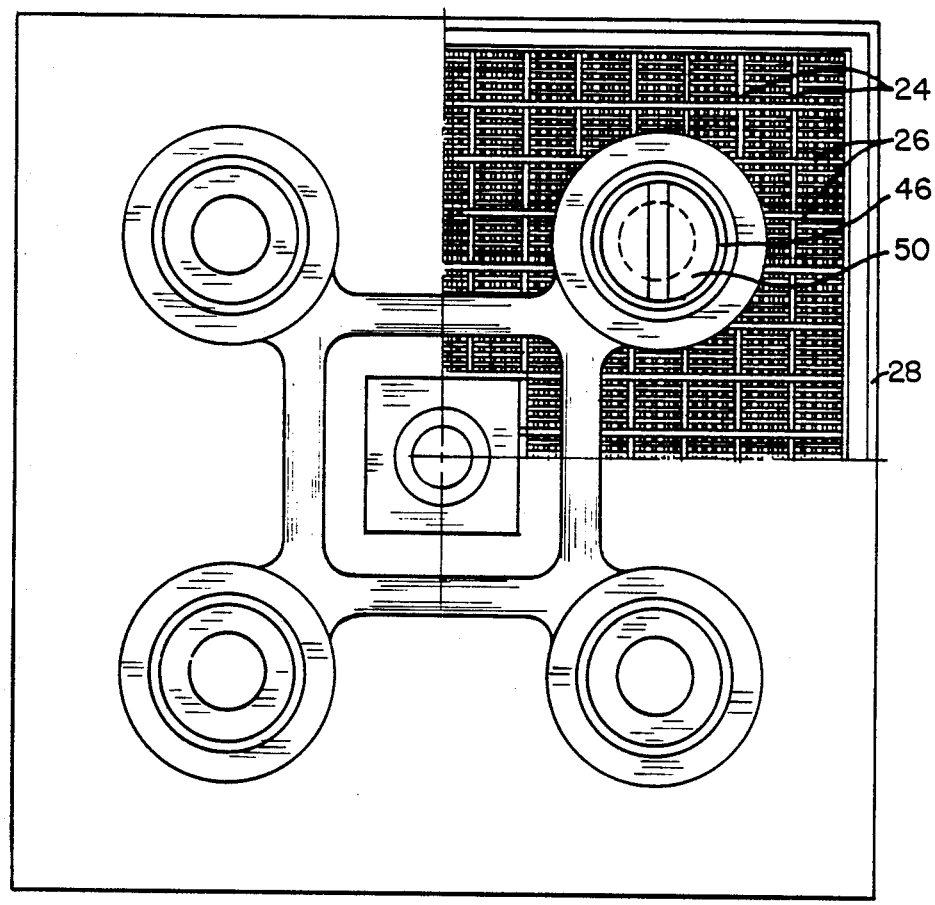
FIG. 4 is a bottom view of the lower end fitting debris collector of FIGS. 1-3.
Figure 5:
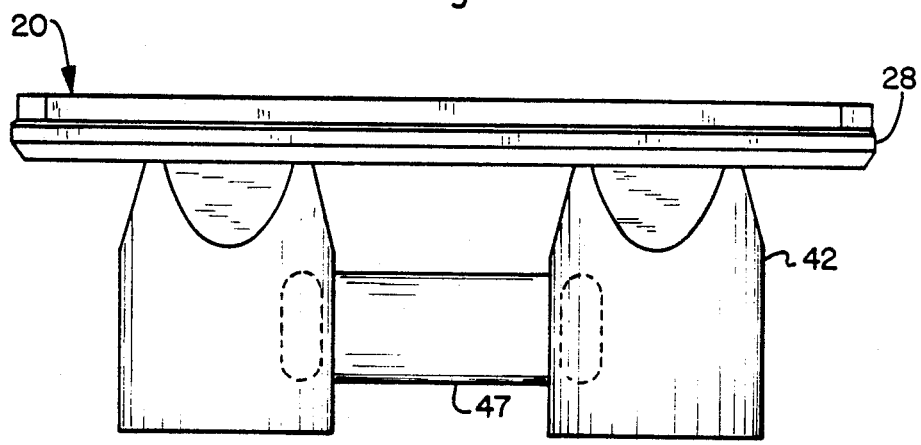
FIG. 5 is a side elevational view of the lower end fitting debris collector of FIGS. 1-4.
Figure 6:
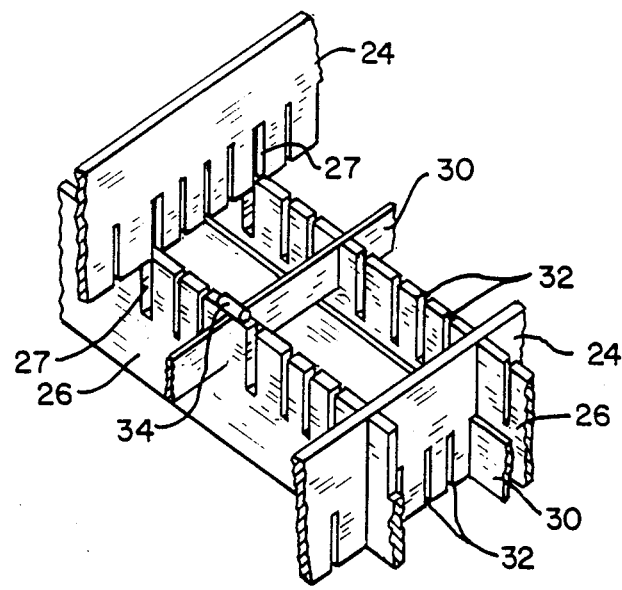
FIG. 6 is an isometric schematic view of tee lower end fitting debris collector partially assembled.

It has been found advantageous in welding to lay a weld bead 34 along the length of the upper edges of bars 26 to hold the bars 24 and 30 of the top side of the grid 21 in assembled relation therewith and to lay a weld bead 36 along the length of the lower edges of bars 24 to hold the bars 26 and 30 of the bottom side of the grid 21 in assembled relation therewith, as shown in FIG. 3.

A lower end fitting debris collector base member 40 is provided which is, typically, a casting of a suitable stainless steel alloy such as A.I.S.I. 304. The base member 40 is welded to bars 24 and 26. In the form illustrated, the base 40 has hollow legs 42 with fastener receiving interior cavities or bores 44 and fastener seats 46. The legs 42 are joined by web members 48 and each leg is welded or brazed into an opening cut into or formed in the grid 21. A flat upper surface 48 of each leg 42 is basically flush with the grid 21 and supports a guide tube 14.

A fastener 50 with a slotted head seated against fastener seat 46 is threaded into the end of an internally threaded end of guide tube 14 to secure the guide tube 14 and lower end fitting debris collector 20. Typically, four guide tubes 14 are thus secured.

In the central portion of grid 21, an insert 51 is provided instead of a leg 42 for providing means to fasten the central guide tube 14. Insert 51 is hollow and has a fastener seat 46a for retaining the head of a fastener 50. It is welded or brazed within an opening in grid 21.

Figure 7:
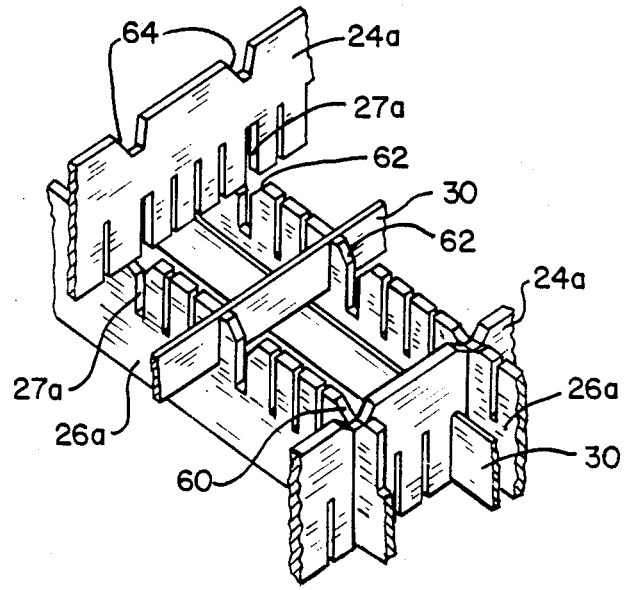
FIG. 7 is a view similar to FIG. 6 showing an embodiment with contoured seats for receiving fuel rods.

As seen in the embodiment illustrated by schematic FIG. 7, where modified grid parts have like numerals to those of the embodiment of FIGS. 1-6 but with the subscript "a", the intersections of bars 24a and 26a form contoured seats 60 for fuel rod end caps 22. Otherwise, the end caps merely sit on the intersecting strips 24 and 26.

The contoured seats for fuel rod end caps 22 illustrated in FIG. 7, are formed by bevels 62 at the open ends of slots 27a of bars 26a. The bars 24a have notches 64 with the same taper as bevels 62 and at locations along the upper edges of bars 24a at the points of intersection with bars 26a. Striss 30 are not affected by seats 60.

In all filtering concepts, it must be noted that filterings will not be 100%. Certain deleterious debris can still escape. The effectiveness of the filter is determined by the amount of debris it will filter. To determine filtering effectiveness, a series of tests of proof of principal wer conducted to measure other devices' filtering ability as compared to the instant invention. The filtering effectiveness of the novel modified lower end fitting of the invention proved to be better than most other devices with the advantage of not affecting fuel rod plenum volume, fuel rod expansion shoulder gap, fuel rod reconstitutability and fuel rod support. Therefore, while it is not possible to entirely eliminate fuel rod failure due to debris, the risk of failures can be greatly reduced by means of the instant invention, thereby increasing fuel assembly reliability without compromising design integrity in the abovementioned ways.

We claim:

1. A lower end fitting debris collector for capturing and retaining deleterious debris carried by reactor coolant flow before the debris enters the active region of a fuel assembly and creates fuel rod cladding damage, comprising in combination:
   a polygonal perimeter member,
   a plurality of debris trapping compartments defined by a plurality of parallel first slotted bars and parallel second slotted bars intersecting and slottedly interlocked with said first bass in a grid-forming arrangement in which the bars ar attached to said perimeter member and to each other,
   a first plurality of parallel strips mounted on said second bars and between said first bar on a first side of said grid,
   a second plurality of parallel strips mounted on said first bars and between said second bars on the side thereof opposite said first side of said grid in an orientation normal to said first plurality of parallel strips,
   and means for fastening the ends of guide tubes to said grid formed by said bars.

2. The lower end fitting debris collector of claim 1 in which the means for fastening guide tubes to said grid formed by said bars includes a base member with a hollow fastener receiving portion which extends through said grid.

3. The lower end fitting debris collector of claim 2 in which the base member is welded to the grid and has means interconnecting a plurality of said hollow fastener receiving portions.

4. The lower end fitting debris collector of claim 1 in which the edges of the bars are slotted to receive the strips such that the strips lie within the width dimension of the bars and grid.

5. The lower end fitting debris collector of claim 1 in which the strips are attached to the polygonal perimeter member.

6. The lower end fitting debris collector of claim 1 in which the strips are thinner than the bars.

7. The lower end fitting debris collector of claim 1 in which the strips on one side of the bars are in engagement with the strips normal thereto on the other side of the bars.

8. The lower end fitting debris collector of claim 1 in which the edges of intersecting bars, at their points of intersection, are contoured to define fuel rod end cap seats.

9. The lower end fitting debris collector of claim 1 in which the strips and bars are held together by strips of weld material deposited along the edges of the bars and their point of intersection with other bars and with strips.

* * * * *